(No Model.)  2 Sheets—Sheet 1.
R. J. McCARTY.
VELOCIMETER.
No. 353,152.  Patented Nov. 23, 1886.
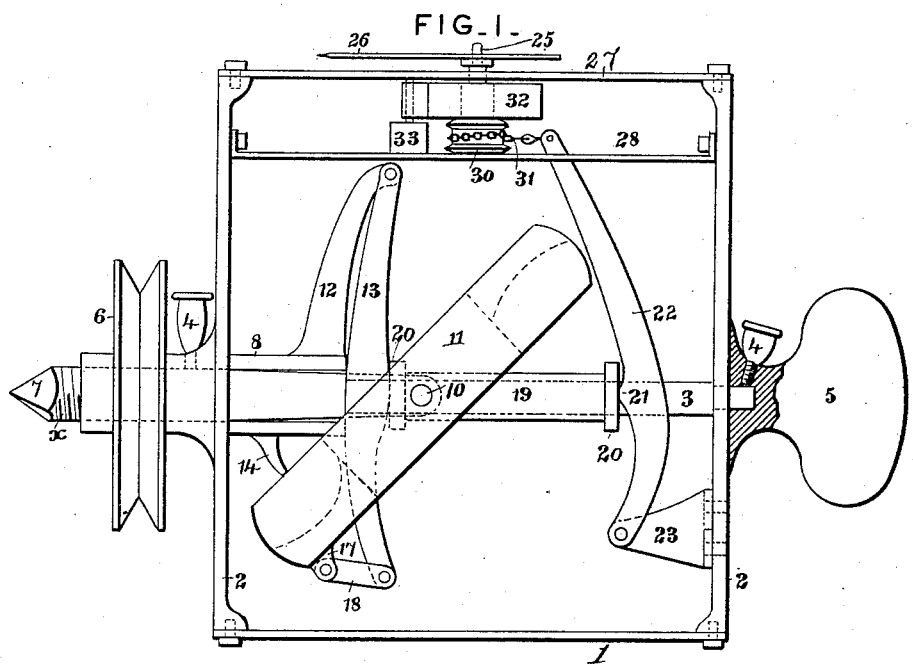
FIG. I.
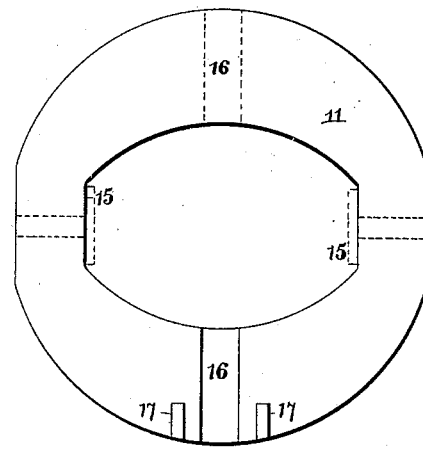
FIG. II.
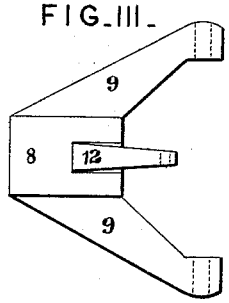
FIG. III.
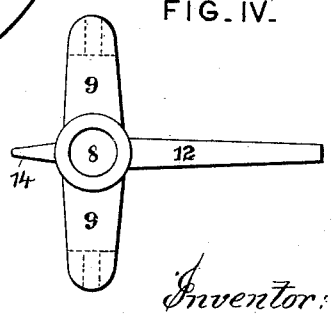
FIG. IV.
Attest:
Geo. T. Smallwood
Jas. K. McCathran
Inventor:
R. J. McCarty
By Knight Bros.
Attys (No Model.) 2 Sheets—Sheet 2.
R. J. McCARTY.
VELOCIMETER.
No. 353,152. Patented Nov. 23, 1886.
FIG.V. 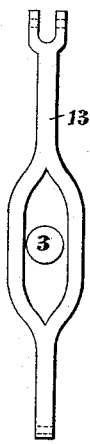
FIG.VI. 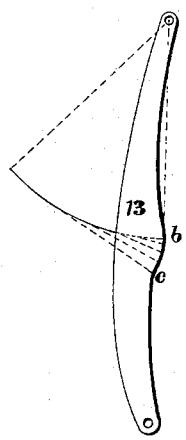
FIG.VII. 
FIG.VIII. 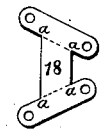
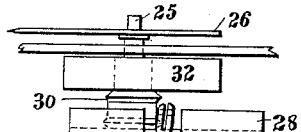
FIG.IX. 
FIG.X. 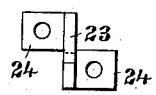
FIG.XI. 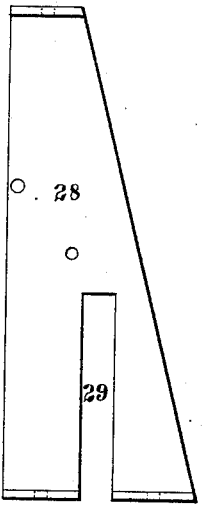
FIG.XII.
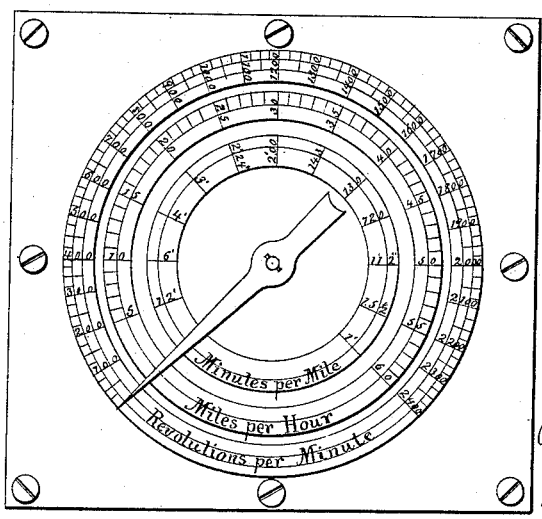
Attest:
Geo. T. Smallwood.
Jas. K. McCathran
Inventor
R. J. McCarty.
By Knight Bros.
attys

UNITED STATES PATENT OFFICE.

RICHARD J. McCARTY, OF KANSAS CITY, MISSOURI.

VELOCIMETER.

SPECIFICATION forming part of Letters Patent No. 353,152, dated November 23, 1886.

Application filed March 5, 1886. Serial No. 194,119. (No model.)

*To all whom it may concern:*

Be it known that I, RICHARD J. MCCARTY, a citizen of the United States, residing at Kansas City, in the county of Jackson and State of Missouri, formerly of Fort Scott, in the county of Bourbon and State of Kansas, have made certain new and useful Improvements in Velocimeters, of which the following is a specification.

My invention has for its object the production of an instrument for measuring the velocity of movement of rotating or lineally-acting machinery which shall be at once simple in construction, exceedingly sensitive in action, and unaffected as to accuracy by the jolting or irregular movement of the machine or engine to which it is applied.

To these ends my improved velocimeter consists of a case wherein is mounted the velocimeter-shaft, a ring-shaped gyratory weight pivoted on a hub keyed to said shaft, a lever pivoted to an arm of said hub at one end and connected by link with one edge of the ring-shaped weight at the other end, said lever having a slot surrounding the shaft, and a bearing surface or cam on each side of said slot, whose curve is an involute of a circle the radius of which is perpendicular from the pivotal point of said lever to the axis of said shaft, a sleeve surrounding said shaft and bearing between the cam just described and a lever connected by a fusee-chain with a barrel or drum whose arbor is controlled by a spring and bears an index, and a dial carrying three circular series of numbered graduations surrounding said arbor, and respectively employed for indicating the number of revolutions of the velocimeter-shaft per minute, the number of linear units of measurements traveled per hour, and the velocity or number of units of time to travel each linear unit. Supposing the velocimeter to be attached to a locomotive, then the outer series of graduations would indicate the number of revolutions of the shaft per minute, the second the number of miles traveled per hour, and the third the velocity in minutes per mile. The inner two scales are made movable, so that at these parts of the dial scales may be used which will accurately indicate velocity of any engine to which the instrument is applied.

In order that my invention may be fully understood, I will proceed to describe it with reference to the accompanying drawings, in which—

Figure I is a side elevation of the velocimeter, its case being shown in section. Fig. II is an elevation of the gyratory weight detached. Figs. III and IV are detail views of the hub, the line of sight being in one case parallel with the shaft and in the other at right angles thereto. Figs. V and VI are similar detail views of the lever carried by said hub. Fig. VII is a plan of the link connecting said lever with the weight. Fig. VIII is a similar view of the blank employed for forming such link. Fig. IX is a rear elevation of the index and its operating-lever and connected parts. Fig. X is a front view of the bracket for supporting said lever. Fig. XI is a plan of the index-arbor-support plate. Fig. XII is a face view of the dial.

1 2 is the casing of my improved velocimeter, of rectangular or cylindrical form. In the sides 2 bearings are provided for the ends of shaft 3, which bearings are lubricated by cups 4. To one of the sides 2 a handle, 5, is fixed. The end of the shaft 3 passing through the other side is provided with grooved pulley 6 and pyramidal end 7, one or the other of which devices, as convenience may dictate, is employed for connecting the instrument to the moving member of the machine or engine whose speed is to be indicated. When intended for continuous use on one machine, the shaft may have a screw-thread, *x*, which is employed for connection with some appropriate shaft on a machine the speed of which is to be measured, and the end of which shaft may be tapped for the purpose. Inside the casing the shaft 3 carries a hub, 8, which is provided with four projecting arms. Of these the arms 9, arranged diametrically opposite each other, have bearings for the pivot-pins or trunnions 10 of the gyratory weight 11. Anti-friction washers, as shown in dotted lines in Fig. II, are placed around the trunnions 10, between the arms 9 and ring. The arm 12, projecting from the hub 8 in a plane at right angles to that of the arms 9, carries at its extreme outer end a lever, 13, pivoted so as to move freely in a plane in which lies also the axis of the shaft 3. The fourth arm, 14, projects from the hub on the side opposite arm 12, and serves to arrest the weight 11 as it tends to assume a position parallel with the shaft 3. The length of the arm 14 is so proportioned to the size and position of the weight 11 as to arrest the weight at such point as will enable it to start from a position of rest with its highest moment of force and to have such moment lessen in proportion as its rotary speed increases. The result of such an arrangement is, that the instrument when operating at a comparatively low speed is as accurate in its operation as when the weight is rotating at a high velocity.

The preferred form of the weight-ring 11 is shown in Fig. II. The sides 15 are flattened, so as to prevent binding on the arms 9. Otherwise the inner surface of the ring is oval or elliptical—a form which, size and weight being equal, presents a longer axis of oscillation and tends to prevention of rocking movement.

In order to allow the weight-ring 11 to assume a position nearly at right angles to the shaft 3 when in rapid rotation, I form recesses, as shown at 16, Fig. II, of width sufficient to receive the lever 13. The preferred form of the recesses is further shown in dotted lines in Fig. I. The depth and form of the recesses is such that the motion of the ring will not be arrested until the bottom of the (here) upper recess, 16, comes in contact with the lever 13 at its pivotal point on arm 12. On each side of the other recess 16 is provided a lug, 17, which lugs serve together for the pivotal connection to the ring 11 of one end of the link 18, which is jointed at its other end to the free end of lever 13. For greater steadiness the link 18 is made of greater width at the end pivoted to the weight 11, tendency to rock sidewise being thus lessened. The manner of forming the link can be clearly seen from Figs. VII and VIII of the drawings. A blank being first cut out of sheet metal in the form shown in Fig. VIII, it is then bent on the dotted lines $a$ $a$, and the projecting lugs thus formed are then bent into parallel planes, as shown in Fig. VII. The weight of the ring 11, lever 13, and link 18 is so disposed that a line joining the pivotal points of the ring in arms 9 will pass through the common center of gravity of these parts.

The lever 13 has a slot surrounding the shaft 3, and is provided with a curved or cam surface on each side of said slot between the points $b$ $c$. The ends $b$ of the curves are arranged to contact with the sleeve 19 on shaft 3 when the instrument is at rest, and lie at that time in a line passing through the axis of the shaft 3. Fig. VI shows the preferred method of forming the curve $b$ $c$. It is the involute of a circle whose center is at the pivot of the lever 13, and whose radius terminates at $b$, that part of the involute curve being taken which lies next to the circumference of the circle, as shown in Fig. VI. The peculiarity of a cam bearing-surface so arranged is, that when the lever 13 is oscillated upon its pivot on the arm 12 the points in contact with the sleeve 19 remain constant in their relation to the axis of the shaft 3—that is to say, the points of contact will always be at the end of the sleeve in a plane passing through the axis of the shaft 3 perpendicularly to the plane in which the lever 13 moves, and as the force for moving said sleeve is exerted in planes parallel with its own axis and the axis of the shaft it is manifest that there will be no unequal friction between the shaft and sleeve which would tend to impair the free reciprocation of the latter. The movement of the sleeve in a plane parallel with its axis can only be accomplished by distributing the force equally around its axis.

To secure strength with lightness the sleeve 19 has flanges 20 at its ends. At the opposite end from the lever 13 the sleeve 19 bears upon projections 21 of a lever, 22, which surrounds the shaft 3 in the same manner as does the lever 13. The form of the lever 22 may be most clearly gained from Figs. I and IX. At bottom it is pivoted to the outer end of a bracket, 23, which, as shown in Fig. X, has ears 24, whereby it is fixed to the side of the box. The lever 22 is so curved and the bracket 23 is of such length that when the lever is forced to its extreme position to the right its upper end will impact upon the side of the casing or box, and the lever will, for the greater part of the length between said upper end and the shaft 3, nearly coincide with such side.

25 is an arbor, carrying an index, 26, and journaled in the top 27 of the box, and in a plate, 28, fixed between the sides of the box.

The lever 22 passes through a slot, 29, (see Fig. XI,) in said plate 28, and is in the inclined position shown in Fig. IX, so that the plane of movement of its upper end will be tangential to the barrel 30 on the arbor 25, as shown in Fig. IX. A chain, 31, fixed to the upper end of the lever 22 at one end and to the barrel 30 at its other, enables the operation of the index by the lever 22 when the latter is reciprocated. A spiral spring, 32, surrounding the arbor 25 is fixed thereto at one end and to a fixed abutment, 33, at its other, and is so arranged as to act upon the index 26 in opposite direction to the weight 11 when the latter is in motion.

The tension of the spring 32 may be changed at will, so that its resisting force at any point will bear the desired relation to that of the weight 11.

The form of dial preferably employed is shown in plan view, Fig. XII. A fixed scale, 34, is employed, whose graduations bear fixed relation to the speed of rotation of the shaft of the velocimeter. Inside this scale are two others—one for indicating the number of miles traveled per hour and the other the number of minutes per mile. These are made removable, and are changed to suit the proportions of the shaft and pulley of the velocimeter to the moving parts of the engine or machine whose speed is to be indicated.

The operation of the device is as follows: The shaft 3 being put in motion, the weight 11 and the arm 13 will be carried thereby, by reason of their pivotal connection with the hub 8, which is fast upon said shaft. As the speed of the shaft increases, there will be a corresponding increase in the centrifugal force of the weight 11, tending to bring the plane of the latter perpendicular to the axis of the former. This rocking of the weight on its trunnions 10 causes the lever 13 to be swung from its pivot, and by bearing against the end of the sleeve or member 19 causes the latter to slide upon the shaft. This sleeve abuts at its other end against and moves the lever 21, thereby causing the chain 31 to be unwound from the barrel 30 and the arbor 25 rotated.

Having thus described my invention, the following is what I claim as new therein and desire to secure by Letters Patent:

1. The combination, with the index and the shaft having means for connecting it with the part whose speed is to be measured, of an annular gyratory weight encircling said shaft, arms projecting from said shaft, to which said weight is pivoted, operative connections between the weight and index, and a projection from said shaft in the path of said weight, whereby the latter is arrested, substantially in the manner and at the instant set forth.

2. In combination with an index and a sleeve or member having connection therewith, a lever having bearing against said sleeve or member, an operating-weight having connection with said lever, and a bearing-surface on said lever whose curve is an involute of a circle whose radius is the perpendicular from the pivotal point of said lever to the axis of the main shaft.

3. In combination with the index and the shaft of a velocimeter, a hub rigid thereon, arms projecting from said hub, a ring-shaped weight encircling said shaft and pivoted on two of said arms, a lever pivoted to another of said arms at one end and connected to said weight at the other, and a sleeve bearing against said lever at one end, substantially as set forth.

4. In combination with the index and the shaft of a velocimeter, a hub rigid thereon having arms projecting therefrom, a weight encircling said shaft pivoted to two of said arms, and a lever pivoted to a third arm having link-connection with said weight, substantially as set forth.

5. In combination with the index and the shaft of a velocimeter, a ring-shaped gyratory weight encircling said shaft and having pivotal connection therewith, a lever, and a link having one end pivoted to said weight and the other to said lever, substantially as and for the purpose set forth.

6. In combination with the index and the shaft, a ring-shaped gyratory weight encircling said shaft and having pivotal connection therewith, the interior opening of the weight being made oval or elliptical in form, with its major axis lying in line with said pivots, substantially as and for the purpose set forth.

7. In combination with the index and the rotary shaft, a hub thereon having arms projecting from opposite sides thereof, a ring-shaped gyratory weight encircling said shaft and pivoted on said arms, a lever pivoted to a third projection from said hub and connected with said weight, and recesses or depressions in said weight to allow the same to assume a position nearly perpendicular to the axis of rotation, substantially as set forth.

RICHARD J. McCARTY.

Witnesses:
E. W. DOUFE,
E. A. BLAKELEY.